United States Patent
Albinsson et al.

(10) Patent No.: US 11,541,882 B2
(45) Date of Patent: Jan. 3, 2023

(54) LOW-IMPACT COLLISION DETECTION

(71) Applicant: Volvo Car Corporation, Gothenburg (SE)

(72) Inventors: Anton Albinsson, Gothenburg (SE); Derong Yang, Gothenburg (SE); Stavros Angelis, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 364 days.

(21) Appl. No.: 16/581,051

(22) Filed: Sep. 24, 2019

(65) Prior Publication Data
US 2021/0086763 A1 Mar. 25, 2021

(51) Int. Cl.
*B60W 30/08* (2012.01)
*B60W 10/04* (2006.01)
(Continued)

(52) U.S. Cl.
CPC .......... *B60W 30/08* (2013.01); *B60W 10/04* (2013.01); *B60W 10/20* (2013.01); *G01C 9/06* (2013.01); *G01P 13/00* (2013.01); *G05B 13/0265* (2013.01); *G05B 13/042* (2013.01); *G05D 1/0223* (2013.01); *B60W 2030/082* (2013.01); *B60W 2520/105* (2013.01); *B60W 2554/00* (2020.02); *B60W 2710/20* (2013.01);
(Continued)

(58) Field of Classification Search
CPC .................................................... B60W 30/08
See application file for complete search history.

(56) References Cited

U.S. PATENT DOCUMENTS

| | | | | |
|---|---|---|---|---|
| 5,309,138 A | * | 5/1994 | Tohbaru | B60R 21/01336 280/235 |
| 5,594,647 A | * | 1/1997 | Yasuda | B60R 21/0133 340/436 |

(Continued)

FOREIGN PATENT DOCUMENTS

| | | |
|---|---|---|
| CN | 102627091 A | 8/2012 |
| CN | 107128304 A | 9/2017 |

(Continued)

OTHER PUBLICATIONS

Extended Search Report from counterpart European Application No. 20197631.3, dated Feb. 23, 2021, 8 pp.
(Continued)

*Primary Examiner* — Redhwan K Mawari
(74) *Attorney, Agent, or Firm* — Shumaker & Sieffert, P.A.

(57) ABSTRACT

In general, techniques are described by which a computing system detects low-impact collisions. A computing system includes at least one processor and memory. The memory includes instructions that, when executed, cause the at least one processor to determine whether an object collided with a vehicle based on a comparison of data received from at least one motion sensor configured to measure at least an acceleration of the vehicle and data received from a plurality of level sensors, wherein each level sensor is configured to measure a relative position between a body of the vehicle and a respective wheel of a plurality of wheels of the vehicle. Execution of the instructions further causes the at least one processor to perform one or more actions in response to determining that the object collided with the vehicle.

20 Claims, 5 Drawing Sheets

(51) Int. Cl.
*B60W 10/20* (2006.01)
*G01C 9/06* (2006.01)
*G01P 13/00* (2006.01)
*G05B 13/02* (2006.01)
*G05B 13/04* (2006.01)
*G05D 1/02* (2020.01)

(52) U.S. Cl.
CPC ............ *B60W 2720/106* (2013.01); *G05D 2201/0213* (2013.01)

(56) References Cited

U.S. PATENT DOCUMENTS

| | | | | |
|---|---|---|---|---|
| 5,684,701 | A * | 11/1997 | Breed | B60R 21/013 180/282 |
| 6,038,495 | A * | 3/2000 | Schiffmann | B60R 21/013 180/282 |
| 6,236,308 | B1 * | 5/2001 | Dalum | B60R 21/0132 340/436 |
| 6,308,134 | B1 * | 10/2001 | Croyle | G01C 21/16 340/990 |
| 8,437,936 | B2 | 5/2013 | Schwarz et al. | |
| 8,755,998 | B2 | 6/2014 | Braennstroem et al. | |
| 9,457,752 | B2 * | 10/2016 | Okamura | B60R 21/0132 |
| 9,487,139 | B1 * | 11/2016 | Ishida | B60W 30/08 |
| 9,996,080 | B2 | 6/2018 | Banvait et al. | |
| 10,055,909 | B2 | 8/2018 | Jenkins et al. | |
| 10,083,551 | B1 | 9/2018 | Schmitt et al. | |
| 10,919,523 | B2 * | 2/2021 | Funk | H04W 4/70 |
| 10,945,672 | B2 * | 3/2021 | Fung | A61B 5/0261 |
| 2004/0210367 | A1 * | 10/2004 | Takafuji | B60R 21/0136 180/274 |
| 2006/0100763 | A1 * | 5/2006 | Tanabe | B60R 21/0136 340/436 |
| 2007/0067085 | A1 * | 3/2007 | Lu | B60T 8/172 701/70 |
| 2014/0297116 | A1 * | 10/2014 | Anderson | B60G 13/14 701/37 |
| 2016/0203656 | A1 | 7/2016 | Bhogal et al. | |
| 2016/0280130 | A1 | 9/2016 | Kia et al. | |
| 2017/0137023 | A1 | 5/2017 | Anderson et al. | |
| 2017/0177954 | A1 | 6/2017 | Micks et al. | |
| 2017/0217429 | A1 * | 8/2017 | Shioe | B60W 30/08 |
| 2017/0350684 | A1 | 12/2017 | Maliszewski | |
| 2019/0039545 | A1 | 2/2019 | Kumar et al. | |
| 2019/0051191 | A1 | 2/2019 | Mosher et al. | |
| 2019/0243371 | A1 | 8/2019 | Nister et al. | |
| 2020/0031297 | A1 * | 1/2020 | Foltin | B60K 28/14 |

FOREIGN PATENT DOCUMENTS

| | | | | |
|---|---|---|---|---|
| CN | 109789777 | A * | 5/2019 | ............ B60K 28/14 |
| DE | 10348997 | A1 * | 5/2005 | ........... B60R 21/013 |
| DE | 10361281 | A1 * | 7/2005 | ............ B60R 16/02 |
| DE | 10361281 | A1 | 7/2005 | |
| DE | 102007046007 | A1 * | 11/2008 | ............ G08G 1/165 |
| DE | 112019001421 | T5 * | 2/2021 | ............ B60W 10/06 |
| EP | 2883771 | B1 | 4/2018 | |
| JP | 2019156267 | A | 9/2019 | |
| WO | 02/20314 | A1 | 3/2002 | |
| WO | 2012104911 | A1 | 8/2012 | |
| WO | 2015/121639 | A1 | 8/2015 | |

OTHER PUBLICATIONS

Atwood, "Mercedes Cars Will Text You If They Get Hit When Parked," autocar.co, Nov. 23, 2017, 4 pp.
YouTube, "2018 Audi A8 Pre Sense," retrieved from https://www.youtube.com/watch?v=YtfCTPtRgnQ, 1 pp.
Response to Search Report from counterpart European Application No. 20197631.3, dated Sep. 16, 2021, 20 pp.
First Office Action and Search Report and translation thereof from counterpart Chinese Application No. 202011014930.4 dated Sep. 5, 2022, 22 pp.

* cited by examiner

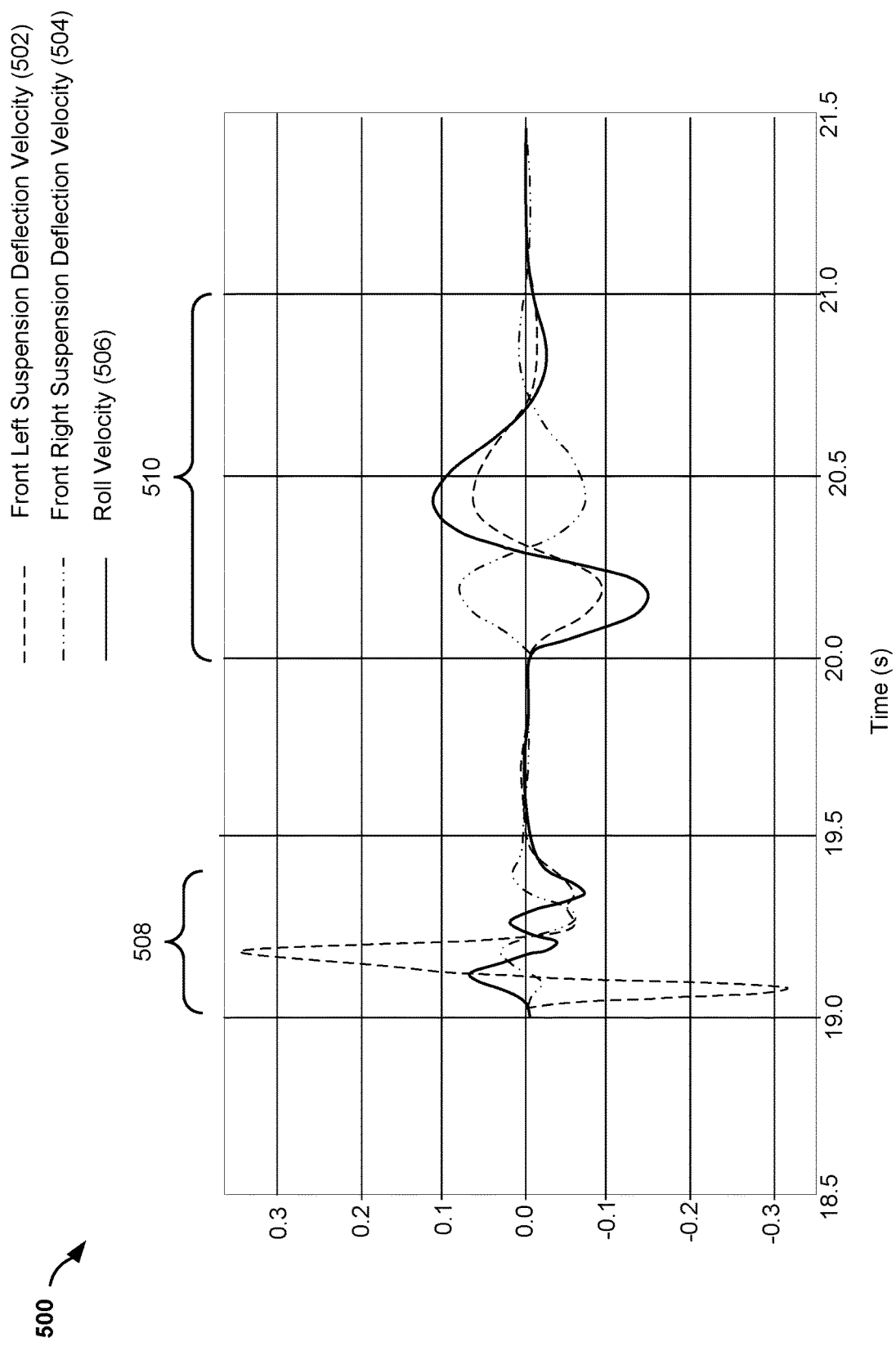

LOW-IMPACT COLLISION DETECTION

TECHNICAL FIELD

This disclosure relates to vehicles and, more specifically, collision detection for vehicles.

BACKGROUND

Vehicles typically include sensors, such as inertial measurement units (IMUs) to detect collisions. A vehicle may deploy an airbag and/or execute post-impact control algorithms to control steering, braking, or other functions of the vehicle after a detecting a collision. Typically, the vehicle deploys the airbags and executes post-impact control algorithms in response to detecting a relatively high-impact collision (e.g., collisions occurring at high speeds). Vehicle sensors may have difficulty detecting relatively low-impact (e.g., low-speed) collisions reliably.

SUMMARY

In general, the disclosed subject matter relates to techniques for enabling an electronic control unit (ECU) to detect low-impact collisions. The ECU detects a low-impact collision based on data from different sets of motion sensors, such as a first set of motion sensors disposed proximate to the vehicle suspension and a second set of motion sensors disposed at approximately the vehicle's center of gravity. In normal driving circumstances, the sensor data from the first set of motion sensors corresponds to the sensor data from the second set of motion sensors. Said another way, the value of a motion parameter (e.g., a roll rate, a pitch rate, an acceleration rate, etc.) calculated based on data generated by the first set of motion sensors is typically very similar to the value of a motion parameter calculated based on data generated by the second set of motion sensors. The ECU may determine that a collision occurred when the sensor data from the first set of motion sensors does not correspond to the sensor data from the second set of motion sensors. That is, when the value of the motion parameter calculated based on the data generated by the first set of motion sensors and the value of the motion parameter calculated based on the data generated by the second set of motion sensors is sufficiently different (e.g., the difference in the values of the motion parameter is greater than a threshold difference), the ECU may infer that a collision has occurred.

Comparing the data from different sets of motion sensors may increase the sensitivity and/or accuracy of the ECU collision detection algorithms. Increasing the sensitivity of collision detection algorithms may enable the ECU to detect low-impact collisions more accurately. Detecting low-impact collisions more accurately may enable the ECU to execute post-impact control algorithms for low-impact collisions (e.g., by controlling the speed and/or steering of the vehicle), which may increase the safety of occupants within the vehicle.

In one example, a computing system is described. The computing system includes at least one processor and a memory. The memory includes instructions that, when executed, cause the at least one processor to: determine whether an object collided with a vehicle based on a comparison of data received from at least one motion sensor configured to measure at least an acceleration of the vehicle and data received from a plurality of level sensors, wherein each level sensor is configured to measure a relative position between a body of the vehicle and a respective wheel of a plurality of wheels of the vehicle; and perform one or more actions in response to determining the object collided with the vehicle.

In another example, a device configured to detect low-impact collisions is described. They device includes means for determining whether an object collided with a vehicle based on a comparison of data received from at least one motion sensor configured to measure at least an acceleration of the vehicle and data received from a plurality of level sensors, wherein each level sensor is configured to measure a relative position between a body of the vehicle and a respective wheel of a plurality of wheels of the vehicle; and means for performing one or more actions in response to determining the object collided with the vehicle.

In another example, a method includes determining whether an object collided with a vehicle based on a comparison of data received from at least one motion sensor configured to measure at least an acceleration of the vehicle and data received from a plurality of level sensors, wherein each level sensor is configured to measure a relative position between a body of the vehicle and a respective wheel of a plurality of wheels of the vehicle; and performing one or more actions in response to determining the object collided with the vehicle.

In another example, a computer-readable storage medium includes instructions that, when executed by at least one processor of a computing system of a vehicle, cause the at least one processor to determine whether an object collided with a vehicle based on a comparison of data received from at least one motion sensor configured to measure at least an acceleration of the vehicle and data received from a plurality of level sensors, wherein each level sensor is configured to measure a relative position between a body of the vehicle and a respective wheel of a plurality of wheels of the vehicle; and perform one or more actions in response to determining the object collided with the vehicle.

The details of one or more aspects of the techniques are set forth in the accompanying drawings and the description below. Other features, objects, and advantages of these techniques will be apparent from the description and drawings, and from the claims.

BRIEF DESCRIPTION OF DRAWINGS

FIG. 5 is a chart illustrating example values of motion parameters during two different driving events, in accordance with one or more techniques of this disclosure.

DETAILED DESCRIPTION

Figure 1:
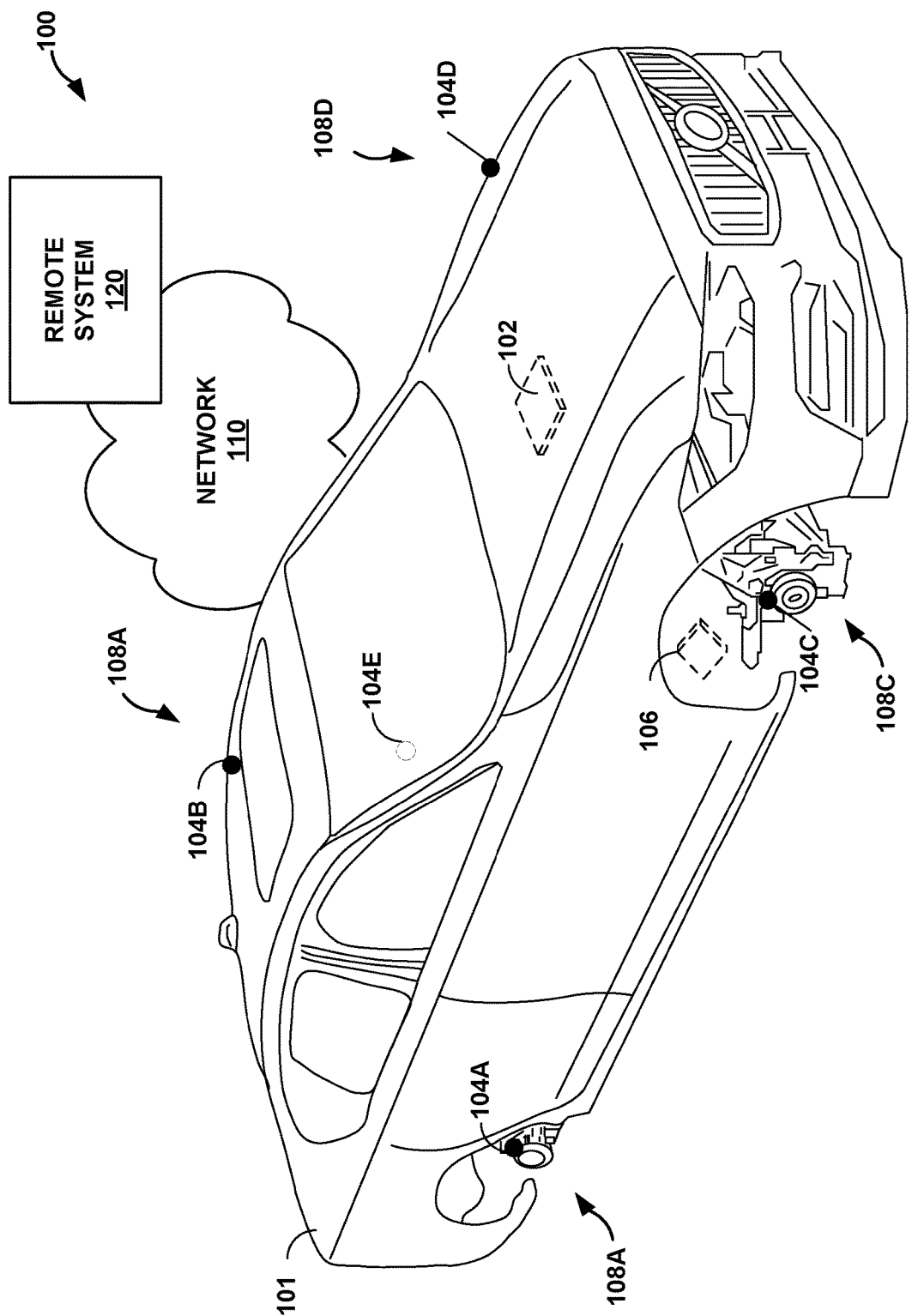
FIG. 1 is a diagram illustrating an example system configured to detect low-impact collisions, in accordance with one or more techniques of this disclosure.

FIG. 1 is a conceptual block diagram illustrating an example system configured to detect low-impact collisions, in accordance with one or more techniques of this disclosure. As shown in the example of FIG. 1, system 100 includes a vehicle 101, a network 110, and a remote system 120.

Vehicle 101 may include any type of autonomous, semi-autonomous, or non-autonomous vehicle. Although shown as an automobile in the example of FIG. 1, vehicle 101 may represent any type of vehicle, including a car, a truck, a bus, a recreational vehicles (RVs), a tractor, an all-terrain vehicles, or any other type of vehicle.

Network 110 may represent any type of network by which communication between vehicle 101 and remote system 120 may be accomplished. Network 110 may represent a public network (e.g., the Internet), a private network, a cellular network (including various cellular data network, such as a 3G, 4G and/or 5G network), a personal area network, or combinations thereof.

Remote system 120 may represent one or more devices configured to communicate via network 110 with vehicle 101. Remote system 120 may communicate via network 110 with vehicle 101 to monitor or otherwise retrieve data from one or more components of vehicle 101, such as an engine, an anti-lock braking system (ABS), a traction control (TC) system, an electronic stability control (ESC) system, brake system, heads-up display system, coolant system, navigation system, infotainment system, or any other component or system integrated into vehicle 101 or in communication with vehicle 101. Remote system 120 may, in addition or as an alternative to monitoring vehicle 101, communicate with vehicle 101 to update one or more of the above noted components of vehicle 101.

As further shown in the example of FIG. 1, vehicle 101 includes a computing system 102, a plurality of sensors 104A-104E (collectively, sensors 104), and one or more components 106. Computing system 102, some of sensors 104, and component 106 are shown in the example of FIG. 1 using dashed lines to denote that computing system 102, sensors 104, and component 106 may not be visible or are otherwise integrated within vehicle 101. As one example, sensors 104A, 104B, 104C, and 104D may be located within wheel wells 108A, 108B, 108C, and 108D, respectively, that house the wheels (although the wheels are not shown so as to illustrate an approximate location of sensors 104A-104D).

Component 106 may include a vehicle suspension component, a steering component, a propulsion component, or an imaging component. Examples of suspension components include wheels, a shock absorber, a strut, or a spring, among other components. In some examples, steering components may include a steering wheel, a steering column, a pinion, one or more tie rods, etc. Examples of propulsion components include a motor (e.g., an electric motor or internal combustion engine), and/or brakes. Imaging components 106 may include a camera (e.g., visible light and/or infrared light), radar, ultrasound, or other device configured to image the environment surrounding or nearby vehicle 101.

Computing system 102 may include one or more electronic control unit (ECUs). For example, computing system 102 may include an ECU configured to control one or more components 106, an ECU configured to control the ABS, TC, and/or ECS, and a main ECU acting as the computing system to direct operation of all of the systems (including those not listed in this example). Generally, an ECU includes a microcontroller, and memory (such as one or more of static random access memory—SRAM, electrically erasable programmable read-only memory—EEPROM, and Flash memory), digital and/or analog inputs, digital and/or analog outputs (such as relay drivers, H bridge drivers, injector drivers, and logic outputs).

In some examples, rather than utilize an ECU as a computing system, computing system 102 may include one or more processors that are relatively more powerful, compared to the microcontroller, and are configured to execute instructions or other forms of software to perform various aspects of the techniques described in this disclosure. The processors may represent one or more of fixed function, programmable, or combinations thereof, such as microprocessors, digital signal processors (DSPs), application specific integrated circuits (ASICs), field programmable gate arrays (FPGAs), discrete logic, software, hardware, firmware or any combinations thereof. When the techniques are implemented partially in software, computing system 102 may store instructions for the software in a suitable, non-transitory computer-readable medium and execute the instructions in hardware using one or more processors to perform the techniques of this disclosure. A device including computing system 102 may comprise an integrated circuit, and/or a microprocessor.

Sensors 104 may be communicatively coupled to computing system 102 and may be configured to measure various motion parameters of vehicle 101 and/or component 106. In some instances, sensors 104 may be configured to generate sensor data indicative of motion of vehicle 101 or component 106. Examples of sensors 104 include an inertial measurement unit (IMU), an accelerometer, a gyroscope, a position sensor, a level sensor, among others. In the example of FIG. 1, sensors 104A-104D include level sensors coupled to component 106 proximate a respective wheel (e.g., within wheel well 108A or 108B). As described herein, a level sensor is a sensor configured to measure the relative position between a wheel and the body of vehicle 101. In one example, sensor 104E includes an IMU, which may be positioned at approximately the center of gravity of vehicle 101. The IMU may include one or more accelerometers and one or more gyroscopes. In another example, sensors 104 include one or more accelerometers and/or gyroscopes proximate the respective corners of vehicle 101. For example, sensors 104 may include two or more accelerometers within the respective wheel wells of a particular axel or coupled to a particular fender of vehicle 101. In such examples, the accelerometers within the respective wheel wells may measure the vertical acceleration.

In accordance with various aspects of the techniques described in this disclosure, computing system 102 determines whether a collision occurred based on data from two different sets of sensors. Computing system 102 receives data from a first set of one or more sensors and from a second set of one or more sensors. In some examples, the first set of sensors includes a plurality of level sensors, such as sensors 104A and 104B. In one example, the second set of sensors includes at least one accelerometer. For example, the second set of sensors may include an IMU (e.g., sensor 104E) proximate the center of gravity of vehicle 101 or a plurality of accelerometers proximate the corners (e.g., within wheel wells 108 or coupled to a fender).

Computing system 102 compares measurements generated by the first set of motion sensors and the second set of motion sensors. For example, computing system 102 may determine a first value of a motion parameter based on the data from the first set of motion sensors. Example motion parameters include an acceleration rate (e.g., vertical and/or translational acceleration), a roll rate, a pitch rate, a pitch angle, or a heave position. For example, computing system 102 may determine a first value of the roll rate based on data from a plurality of level sensors, such as sensors 104A-104B. Computing system 102 determines a second value of the motion parameter based on data from the second motion sensor set. For instance, computing system 102 may determine a second value of the roll rate based on data from an IMU, such as sensor 104E. In another example, computing system 102 may determine a value of a pitch rate and/or pitch angle based on data from level sensors on a front axel and a rear axel (e.g., sensors 104A and 104C) and a value of a pitch rate and/or pitch angle based on data from the IMU (e.g., sensor 104E).

In some examples, computing system 102 determines whether an object collided with vehicle 101 based at least in part on the first value of the motion parameter and the second value of the motion parameter. Computing system 102 may apply one or more rules to the first value of the motion parameter and the second value of the motion parameter. The rules may be hard-coded or machine generated (e.g., via machine learning). In one example, the rule indicates a threshold difference between the first value of the motion parameter and the second value of the motion parameter to indicate whether the object collided with the vehicle. That is, in some examples, computing system 102 determines a difference between the first value of the motion parameter and the second value of the motion parameter. Computing system 102 may determine whether the difference satisfies (e.g., is greater than or equal to) a threshold difference. In one example, computing system 102 determines a value of the roll rate based on data from level sensors 104A and 104B, a value of the roll rate based on data from IMU 104E, and determines a difference in the roll rate. While described as determining a difference in the roll rate of vehicle 101, computing system 102 may determine a difference in the values of any of the motion parameters.

Computing system 102 dynamically determines, in some examples, the threshold difference. For example, computing system 102 may determine the threshold difference based on a speed of vehicle 101. As one example, computing system 102 may increase the threshold difference from a baseline as the speed of the vehicle increases. In some instances, the threshold difference is pre-programmed.

In some scenarios, computing system 102 determines whether an object collided with vehicle 101 based on the difference between the first value of the motion parameter and the second value of the motion parameter and a threshold difference. For example, during normal driving (e.g., when vehicle 101 is not experiencing a collision with another vehicle or other object) or when vehicle 101 is not moving, the first value of the motion parameter and the second value of the motion parameter should be similar as the parts of the vehicle move relatively in unison. However, as one example, if an object collides with vehicle 101 near a wheel well (e.g., wheel well 108A) at a low speed, the rear passenger side of vehicle 101 may move more than vehicle 101 as a whole, such that the difference between the first value of the motion parameter calculated based on sensor data from a plurality of level sensors (e.g., sensors 104A-104B) and the second value of the motion parameter calculated based on sensor data from an IMU (e.g., 104E) may satisfy the threshold difference. For example, the value of the roll rate calculated using data from sensors 104A-104B may be more than a threshold difference from the value of the roll rate calculated using data from sensor 104E when an object strikes or collides with vehicle 101. Thus, computing system 102 may determine that an object collided with vehicle 101 in response to determining that the difference between the first value of the motion parameter and the second value of the motion parameter satisfies the threshold difference.

Responsive to determining that the object collided with vehicle 101, computing system 102 performs one or more actions. For example, computing system 102 may execute a post-impact control by outputting a command to one or more components 106 to adjust operation of vehicle 101. For example, the command may include a command to adjust a speed of vehicle 101 or adjust a steering component of vehicle 101. For example, computing system 102 may output a command to one or more components 106 to adjust an electric motor speed (e.g., increasing the speed, for example, to avoid a secondary collision, or decrease the speed), apply the brakes, turn the wheels left or right, or a combination thereof.

As another example, computing system 102 may activate one or more imaging components 106 in response to detecting a collision. For example, computing system 102 may output a command to activate one or more of imaging components in response to detecting a collision when the imaging components are inactive (e.g., when vehicle 101 is turned off). As another example, computing system 102 may output a command to store image data generated by the imaging components in response to detecting a collision (e.g., whether vehicle 101 is on or off). For example, one or more imaging components may output a command causing a storage device to store the image data generated by the imaging components.

As yet another example, computing system 102 may output a notification in response to detecting a collision. For example, computing system 102 may send a notification (e.g., email, text, or other message) to the owner of vehicle 101 in response to detecting a collision (e.g., when vehicle 101 is off, such as when vehicle 101 is parked). In some instances, computing system 102 may send a notification to a police authority in response to detecting a collision. In some instances, computing system 102 may determine whether vehicle 101 is currently unoccupied or whether the object that collided with vehicle 101 (e.g., another vehicle) left the scene. In such instances, computing system 102 may output a notification to a police authority or to the owner of vehicle 101 in response to detecting a collision and that vehicle 101 is unoccupied or that the object which collided with vehicle 101 left the scene. In some scenarios computing system 102 may output a notification to an insurance company or a vehicle manufacturer in response to detecting the collision.

Although computing system 102 is described as applying the techniques described in this disclosure, computing system 102 may, in addition or alternatively, interface with remote system 120 via network 110 to provide the sensor data itself. Remote system 120 may, in this example, determine whether an object collided with vehicle 101. Remote system 120 may also, in this example, perform one or more actions, such as outputting notifications, activating one or more imaging components, storing image data, or possibly activating post-impact controls.

By utilizing sensor data from different sets of motion sensors, computing system 102 may detect low-impact collisions and/or detect low-impact collisions more accurately. Detecting low-impact collisions more accurately may enable the computing system 102 to perform post-impact control for low-impact collisions, for example by controlling a speed of vehicle 101 and/or controlling the steering of vehicle 101. Performing post-impact control after an initial collision may assist the driver to move vehicle 101 or may autonomously move vehicle 101, which may increase the safety of the vehicle occupants (e.g., by reducing the risk of vehicle 101 experiencing a secondary collision, for instance, such as being rear-ended by a second vehicle after colliding with a first vehicle).

Figure 2:
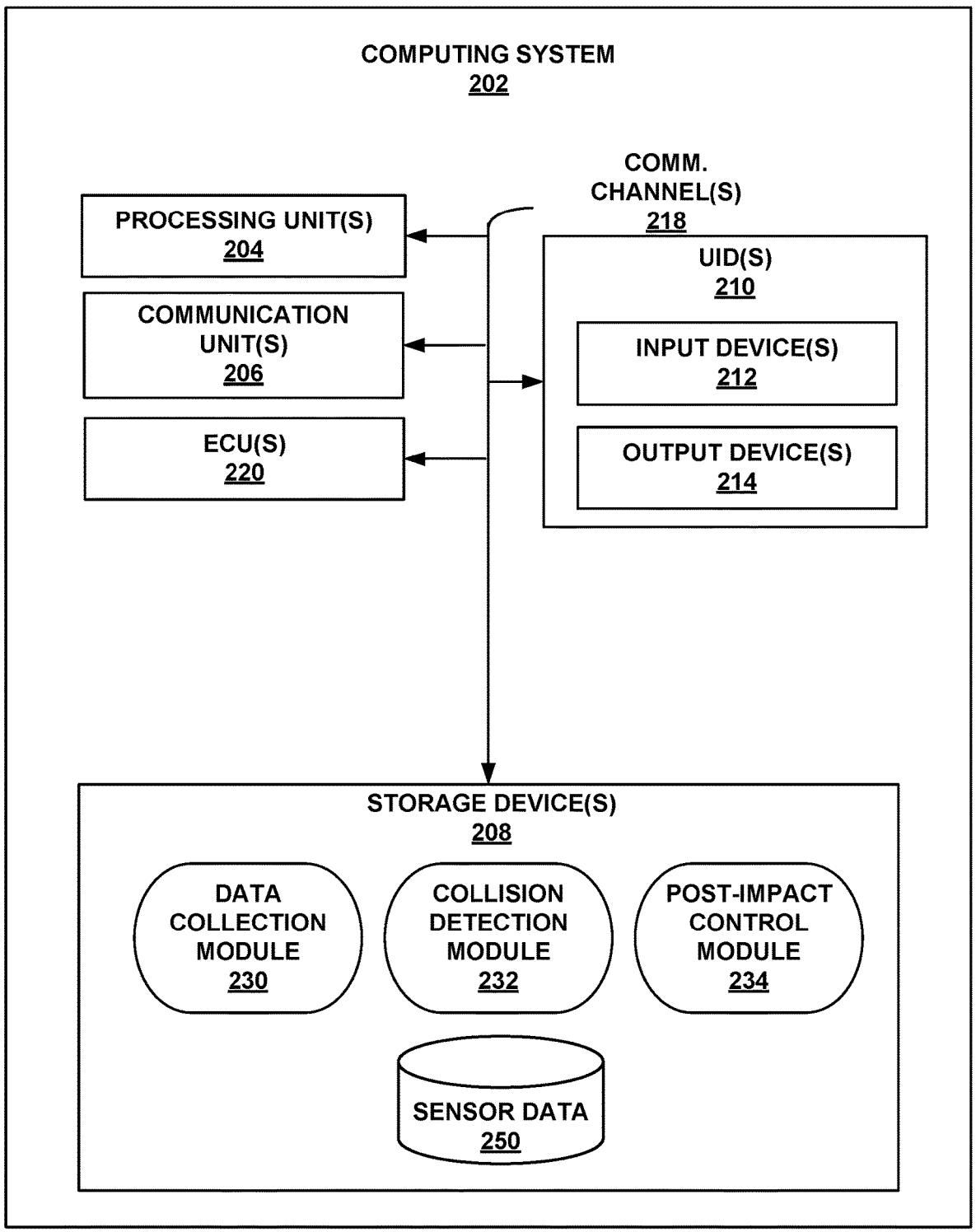
FIG. 2 is a block diagram illustrating an example computing system configured to detect low-impact collisions, in accordance with one or more techniques of this disclosure.

FIG. 2 is a block diagram illustrating an example computing system configured to detect low-impact collisions, in accordance with one or more techniques of this disclosure. Computing system 202 represents an example of computing system 102 described above with reference to FIG. 1. As illustrated in FIG. 2, computing system 202 includes at least one processing unit 204, at least one communication unit 206, at least one storage device 208, at least one user interface device (UID) 210, at least one communication channel 218, and one or more ECUs 220. FIG. 2 illustrates only one particular example of computing system 202, and many other examples of computing system 202 may be used in other instances and may include a subset of the components included in example computing system 202 or may include additional components not shown in FIG. 2.

Processing units 204 may represent a unit implemented as fixed-function processing circuits, programmable processing circuits, or a combination thereof. Fixed-function circuits refer to circuits that provide particular functionality and are pre-set on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

Communication units 206 may represent a unit configured to communicate with one or more other computing systems by transmitting and/or receiving data. Communications units 206 may include wired and/or wireless communication units. Examples of wired communication units 206 include Universal Serial Bus (USB) transceivers. Examples of wireless communication units 206 include GPS radios, cellular (e.g., LTE) radios, Bluetooth™ radios, WiFi™ radios, or any other wireless radios.

In some examples, storage device 208 may represent a unit configure to store one or more modules, such as data collection module 230, collision detection module 232, and post-impact control module 234 shown in FIG. 2. Storage device 208 may be a temporary memory, meaning that a primary purpose of storage device 208 is not long-term storage. Storage device 208 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device 208 may include one or more non-transitory computer-readable storage devices. Storage device 208 may be configured to store larger amounts of information than typically stored by volatile memory. Storage device 208 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage device 208 may store program instructions and/or information (e.g., data) that, when executed, cause processing unit 204 to perform the techniques of this disclosure. For example, storage device 208 may include data or information associated with one or more modules 230, 232, and 234.

User interface devices (UID) 210 may represent a unit configured to enable a user to interact with computing system 202. UIDs 210 may include one or more input devices 212 and/or more output devices 214. Examples of input devices 212 include display devices, keyboards, pointing devices (such as a mouse or digital pen), microphones, physical buttons or knobs, among others. Examples of output devices 214 include display devices and speakers, among others. Display devices may include touchscreens (e.g., capacitive or resistive). Example display devices include liquid crystal displays (LCD), light emitting diode (LED) displays, organic light-emitting diode (OLED) displays, e-ink, or other device configured to display information to a user.

ECUs 220 may represent one or more electronic control units configured to control electronics and various subsystems of vehicle 101, such as the above noted ABS and ESC system. ECUs 220 may each be implemented as an embedded system, which may include a microcontroller or other type of processor, memory, inputs, and outputs as noted above. ECUs 220 may interface with one or more of sensors 104 (FIG. 1) in the manner described above in support of the electronics and/or subsystems.

Communication channels 218 may represent a unit configured to interconnect each of components 204, 206, 208, 210, and/or 220 for inter-component communications (physically, communicatively, and/or operatively). In some examples, communication channels 218 may include a system bus, a network connection, one or more inter-process communication data structures, or any other components for communicating data.

As further shown in the example of FIG. 2, storage device 208 stores data collection module 230, collision detection module 232, post-impact control module 234, and sensor data 250. Processing units 204 may interface with storage device 208 to retrieve one or more instructions of data collection module 230 that, when executed, cause processing units 204 to perform operations directed to collection of sensor data 250 from ECUs 220 via communication channels 218. Similarly, processing units 204 may interface with storage device 208 to retrieve one or more instructions of collision detection module 232 that, when executed, cause processing units 204 to perform operations directed to detecting low impact collisions based on sensor data 250, as discussed above. Similarly, processing units 204 may interface with storage device 208 to retrieve one or more instructions of post-impact control module 234 that, when executed, cause processing units 204 to perform operations directed to outputting one or more commands to components 106 to adjust operation of vehicle 101. Reference to modules 230, 232, and 234 performing various operations should be understood to refer to processing units 204 performing the various operations discussed with respect to each of modules 230, 232, and 234.

In any event, data collection module 230 may execute one or more communication protocols, such as the above noted controller area network (CAN) communication protocol, the FlexRay communication protocol or any other communication protocol, to interface with ECUs 220 and thereby indirectly interface with the associated ones of sensors 104. In some examples, data collection module 230 may interface directly with sensors 104 to collect sensor data 250. Sensor data 250 may represent data indicative of sensor signals output by sensors 104. Data collection module 230 may store sensor data 250 to storage device 208. While data collection module 230 may store sensor data 250 to storage device 208, in some examples, collection detection module 232 analyzes sensor data 250 in real-time or substantially real-time to detect collisions between vehicle 101 and another object.

Collision detection module 232 determines whether a collision occurred based on sensor data from two different sets of sensors 104 of FIG. 1. In one example, the first set of sensors 104 includes a plurality of level sensors (e.g., sensors 104A and 104B of FIG. 1). In some examples, the second set of sensors 104 includes at least one accelerometer (e.g., sensor 104E of FIG. 1). The at least one accelerometer may include an accelerometer (e.g., part of an IMU) proximate the center of gravity of vehicle 101 or a plurality of accelerometers proximate the corners (e.g., within wheel wells 108 or coupled to a fender) of vehicle 101.

In some examples, collision detection module 232 determines a value of a motion parameter based on the sensor data from each of the first set of sensors 104 and the second set of sensors 104. Example motion parameters include an acceleration rate, a roll rate, a pitch rate, a pitch angle, or a heave position. Collision detection module 232 may determine a first value of a motion parameter based on the sensor data 250 received from the first set of sensors and a second value of a motion parameter based on sensor data 250 received from the second set of sensors. In some examples, collision detection module 232 determines a value for a single motion parameter for each set of sensors. In some instances, collision detection module 232 determines a respective value for two or more motion parameters for each set of sensors. For instance, collision detection module 232 may determine a value of a roll rate for each set of sensors and a value of a pitch rate for each set of sensors.

Collision detection module 232 determines whether an object collided with vehicle 101 based at least in part on the first value of the motion parameter and the second value of the motion parameter. In other words, collision detection module 232 determines whether vehicle 101 experienced a collision based on the values of the motion parameter. Collision detection module 232 may apply one or more rules to the first value of the motion parameter and the second value of the motion parameter. The rules may be hard-coded or machine generated (e.g., via machine learning).

In one example, the rules indicates a threshold difference between the first value of motion parameter and the second value of the motion parameter to indicate whether the object collided with the vehicle. That is, in some examples, collision detection module 232 determines a difference between the first value of the motion parameter and the second value of the motion parameter. Collision detection module 232 may determine whether the difference satisfies (e.g., is greater than or equal to) a threshold difference. In one example, collision detection module 232 determines a value of the roll rate based on data from level sensors 104A and 104B, a value of the roll rate based on data from IMU 104E, and determines a difference in the roll rate. While described as determining a difference in the roll rate of vehicle 101, computing system 102 may determine a difference in the values of any of the motion parameters.

In some scenarios, collision detection module 232 determines whether an object collided with vehicle 101 based on the difference between the first value of the motion parameter and the second value of the motion parameter and a threshold difference. In one scenario, collision detection module 232 determines that vehicle 101 has not collided with an object in response to determining that the difference between the first value of the motion parameter and the second value of the motion parameter does not satisfy (e.g., is less than) the threshold difference. In another scenario, collision detection module 232 determines that an object collided with vehicle 101 in response to determining that the difference between the first value of the motion parameter and the second value of the motion parameter satisfies the threshold difference.

In another example, the rules are machine-generated. That is, collision detection module 232 may apply a first set of sensor data and a second set of sensor data to a model trained using machine learning to detect collisions between vehicle 101 and another object. That is, collision detection module 232 may train a machine-learning model based on historical sensor data 250 and classifications (e.g., collisions and non-collisions) associated with the historical sensor data. Examples of machine learning models include nearest neighbor, naïve Bayes, decision trees, linear regression, support vector machines, neural networks, k-Means clustering, Q-learning, temporal difference, deep adversarial networks, evolutionary algorithms, or other models trained using supervised, unsupervised, semi-supervised, or reinforcement learning algorithms, or combinations of any of the foregoing. Collision detection module 232 may determine whether vehicle 101 experienced a collision in real-time or approximately real-time by applying the first and second sets of sensor data to the machine-learned model.

Additionally or alternatively to using the values of the motion parameters to detect a collision, in some examples, collision detection module 232 determines whether an object collided with vehicle 101 based on a based on a time at which the sensor data was received from the first set of sensors and a time at which the data was received from the second set of sensors. For example, during normal driving (e.g., when vehicle 101 is not experiencing a collision with another vehicle or other object), a plurality of level sensors may measure the road profile earlier than a set of one or more accelerometers. That is, the plurality of level sensors may detect an event (e.g., driving over a bump or pothole, etc.) prior to the set of one or more accelerometers. In such examples, collision detection module 232 may determine that vehicle 101 collided with an object in response to determining that the sensor data from the set of level sensors corresponding to a particular event was generated prior to the sensor data from the set of accelerometers corresponding to the event. In instances where the event includes a collision (e.g., an object collides with vehicle 101 near a wheel well at a low speed), the set of accelerometers may generate sensor data indicative of the event prior to the set of level sensors generating sensor data indicative of the event. In such instances, collision detection module 232 may determine that an object collided with vehicle 101 in response to determining that the sensor data from the set of accelerometers corresponding to the event was generated prior to the sensor data from the set of level sensors corresponding to the event.

Responsive to determining that the object collided with vehicle 101, computing system 202 performs one or more actions. For example, computing system 202 may execute post-impact control module 234, which may output a command to one or more components 106 of FIG. 1 to adjust operation of vehicle 101. For example, the command may include a command to adjust a speed of vehicle 101 or adjust a steering component of vehicle 101. For example, post-impact control module 234 may output a command to one or more components 106 to adjust an electric motor speed (e.g., increasing the speed, for example, to avoid a secondary collision, or decrease the speed), apply the brakes, turn the wheels left or right, or a combination thereof.

As another example, computing system 202 may activate one or more imaging components 106 in response to detecting a collision. For example, computing system 202 may activate one or more of imaging components in response to detecting a collision when the imaging components are inactive (e.g., when vehicle 101 is turned off). As another example, computing system 202 may store the image data generated by the imaging components to sensor data 250 in response to detecting a collision.

As yet another example, computing system 202 may output a notification in response to detecting a collision. In one example, collision detection module 232 of computing system 202 may output a notification via output device 214 of UID 21, such as a visual notification and/or audible notification. In another example, collision detection module 232 may send a notification (e.g., email, text, or other message) to the owner of vehicle 101 via communication units 206 in response to detecting a collision (e.g., when vehicle 101 is unoccupied). In some instances, collision detection module 232 may send a notification to a police authority, an insurance company, and/or a vehicle manufacturer in response to detecting a collision.

Figure 3:
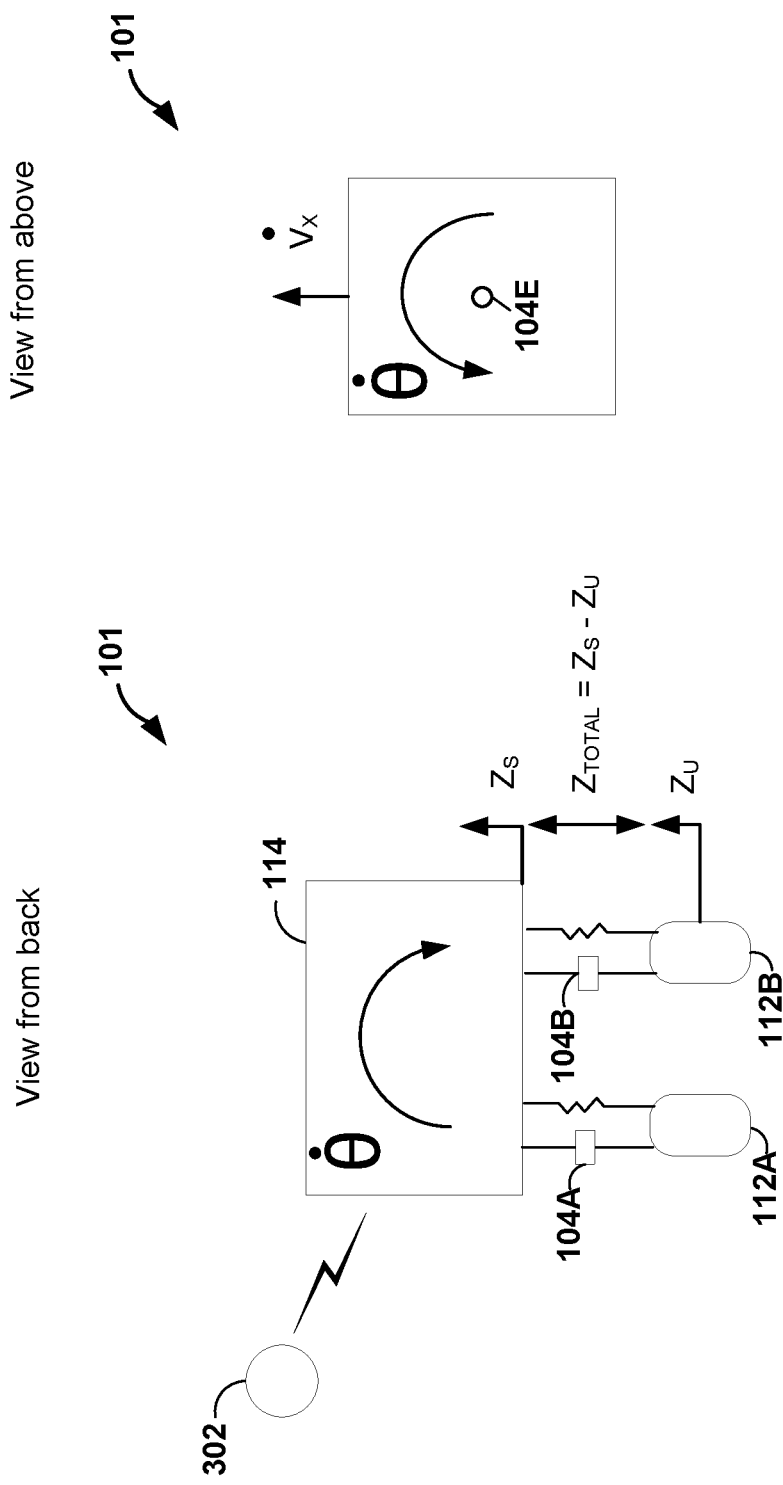
FIGS. 3A and 3B are conceptual diagram illustrating an example technique for detecting low-impact collisions, in accordance with one or more techniques of this disclosure.

FIGS. 3A-3B are conceptual diagrams illustrating an example technique for detecting low-impact collisions, in accordance with one or more techniques of this disclosure. For purposes of illustration only, FIGS. 3A-3B are described below within the context of system 100 of FIG. 1.

FIG. 3A is a conceptual diagram illustrating a rear view of a collision between vehicle 101 and an object 302. Motion sensors 104A and 104B (e.g., level sensors) measure a relative position between body 114 of vehicle 101 and wheels 112A and 112B, respectively. For example, body 114 of vehicle 101 may move vertically a distance of $Z_S$ and wheels 112 of vehicle 101 may move vertically a distance of $Z_U$. Motion sensors 104A and 104B may generate sensor data indicative of the distance $Z_{TOTAL}$ ($Z_S$-$Z_U$) between body 114 and wheels 112A and 112B. Computing system 102 may calculate a first value of a motion parameter, (e.g., a roll rate, a pitch rate, etc.) based on the sensor data generated by sensors 104A and 104B. For example, computing system 102 may determine the second value of the roll rate $\theta$ based on $Z_{TOTAL}$ measured by each of sensors 104.

FIG. 3B is a conceptual diagram illustrating a top view of the collision between vehicle 101 and object 302. At least one accelerometer generates sensor data. In the example of FIG. 3B, sensor 104E (e.g., an IMU) is located at approximately the center of mass of the body 114 of vehicle 101. In one example, sensor 104E generates sensor data indicative of the acceleration of vehicle 101 (e.g., in three dimensions). Computing system 102 may generate a value of the motion parameter based on the sensor data from sensor 104E. For example, computing system 102 may calculate a second value of the roll rate $\theta$.

Computing system 102 determines whether vehicle 101 experienced a collision based on the first and second values of the motion parameter (e.g., the first and second values of the roll rate $\theta$). In other words, computing system 102 determines whether an object collided with vehicle 101 based on the first value of the motion parameter and the second value of the motion parameter. In some scenarios, computing system 102 determine whether the object collided with the vehicle by determining a difference between the first value of the motion parameter and the second value of the motion parameter. For instance, computing system 102 may determine that the object collided with the vehicle in response to determining that the difference in the values of the motion parameter satisfies (e.g., is greater than or equal to) a threshold difference. In another instance, computing system 102 determines that the object collided with the vehicle in response to determining that the difference in the values of the motion parameter does not satisfy (e.g., is less than) the threshold difference.

In one scenario, computing system 102 determines whether the object collided with vehicle 101 by applying the first and second values of the motion parameter to a machine-trained model. The model may be trained using historical sensor data and associated classifications (e.g., "collision" or "not a collision"). Computing system 102 may input the first and second values into the machine-trained model and output data indicating whether vehicle 101 experienced a collision with another object. In other words, computing system 102 may determine whether an object collided with vehicle 101 based on the output of the machine-trained model.

Figure 4:
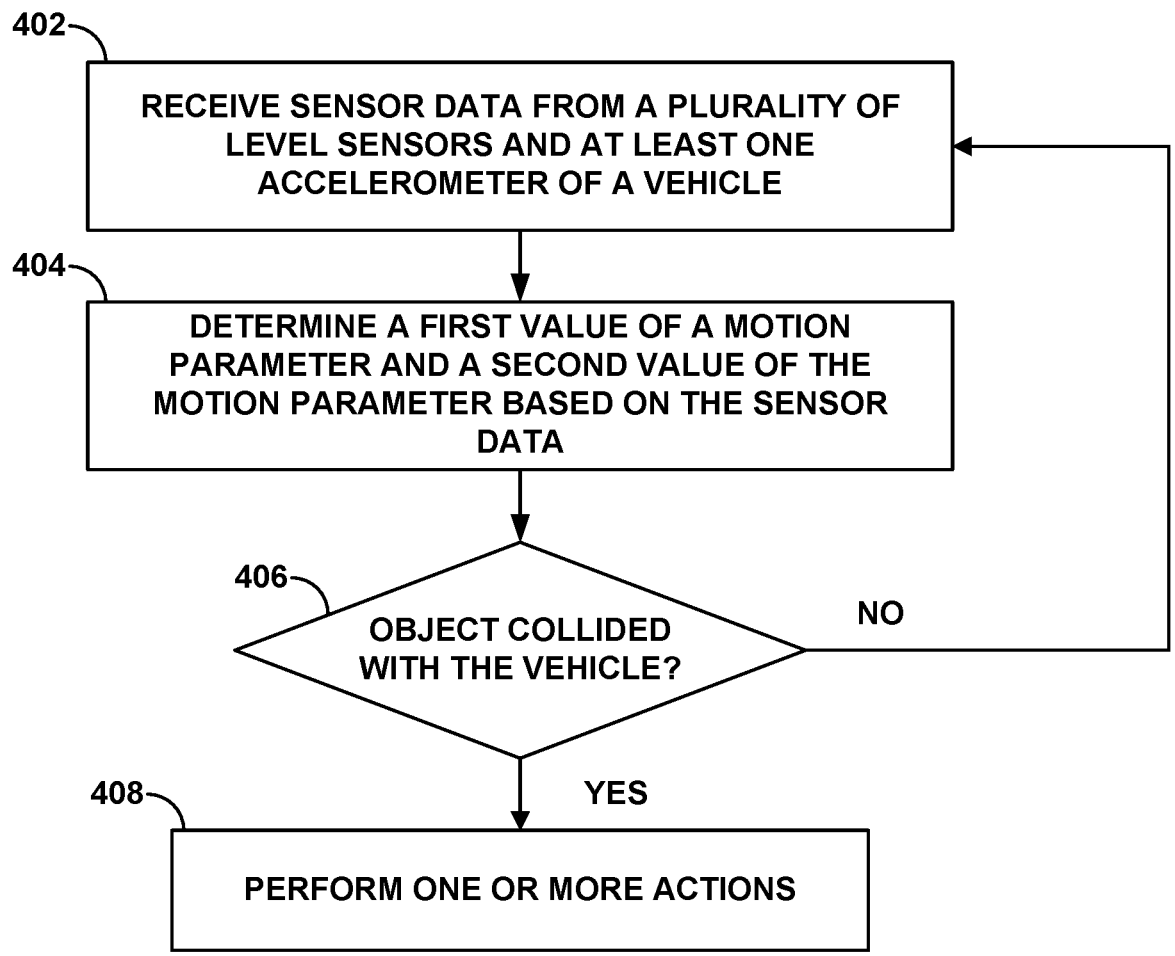
FIG. 4 is a flowchart illustrating an example technique for detecting low-impact collisions, in accordance with one or more techniques of this disclosure.

FIG. 4 is a flowchart illustrating an example technique for detecting low-impact collisions, in accordance with one or more techniques of this disclosure. For purposes of illustration only, FIG. 4 is described below within the context of system 100 of FIG. 1.

In the example of FIG. 4, computing system 102 of vehicle 101 receives sensor data from a plurality of level sensors (e.g., sensors 104A and 104B) and at least one accelerometer (e.g., sensor 104E) of vehicle 101 (402). Each level sensor is configured to measure a relative position between a body of vehicle 101 and a respective wheel of vehicle 101. In one example, the at least one accelerometer includes the accelerometer of an IMU located proximate to the center of mass of vehicle 101. In another example, the at least one accelerometer includes a plurality of accelerometers located proximate to respective corners of vehicle 101 (e.g., within wheel wells 108 or coupled to a fender).

Computing system 102 determines a first value of a motion parameter and a second value of the motion parameter based on the sensor data (404). Example motion parameters include an acceleration rate, a roll rate, a pitch rate, a pitch angle, or a heave position. For example, computing system 102 may determine a first value of the pitch rate based on sensor data from the plurality of level sensors and a second value of the pitch rate of vehicle 101 based on the sensor data from the IMU.

Computing system 102 determines whether an object collided with vehicle 101 based on the first value of the motion parameter and the second value of the motion parameter (406). Computing system 102 may determine whether the object collided with the vehicle by determining a difference between the first value of the motion parameter and the second value of the motion parameter. In one instance, computing system 102 may determine that the object collided with the vehicle in response to determining that the difference in the values of the motion parameter satisfies (e.g., is greater than or equal to) a threshold difference. In another instance, computing system 102 determines that the object collided with the vehicle in response to determining that the difference in the values of the motion parameter does not satisfy (e.g., is less than) the threshold difference.

In one scenario, computing system 102 determines whether the object collided with vehicle 101 by applying the first and second values of the motion parameter to a machine-trained model. The model may be trained using historical sensor data and associated classifications (e.g., "collision" or "not a collision"). Computing system 102 may input the first and second values into the machine-trained model and output data indicating whether vehicle 101 experienced a collision with another object. In other words, computing system 102 may determine whether an object collided with vehicle 101 based on the output of the machine-trained model.

Computing system 102 continues to receive sensor data (402) in response to determining that vehicle 101 has not experienced a collision ("NO" branch of 406). For example, computing system 102 may continuously analyze the sensor data to determine whether an object has collided with vehicle 101.

Responsive to determining that the object collided with the vehicle ("YES" branch of 406), computing system 102 performs one or more actions (408). In one example, computing system 102 outputs a command to activate one or more imaging components and/or store image data generated by the imaging components. In another example, computing system 102 may perform an action by outputting a notification. For example, computing system 102 may output a notification to the owner of vehicle 101, a policy authority or other law enforcement agency, an insurance company, among others.

FIG. 5 is a chart illustrating example values of motion parameters during two different driving events, in accordance with one or more techniques of this disclosure. FIG. 5 is described in the context of vehicle 101 of FIG. 1. Chart 500 illustrates the front left suspension deflection 502, front right suspension deflection 504, and roll velocity 506 of vehicle 101 during a first time period 508 and a second time period 510. During time period 508, vehicle 101 passes over a bump in the road. During time period 508, vehicle 101 experiences an impact (e.g., an object colliding with vehicle 101).

Computing system 102 may receive data from a plurality of level sensors and one or more accelerometers. As illustrated in FIG. 5, computing system 102 determines, based on the data from sensors 104 during time period 508, that the suspension deflection velocities 502 and 504 are in the same direction as roll velocity 506. In one example, computing system 102 determines that vehicle 101 experienced normal driving conditions, for example, driving over a bump or making a left-hand turn based on the sensor data indicative of the suspension deflection velocities 502 and 504 and roll velocity 506.

In one example, computing system 102 may determine that vehicle 101 experienced a collision during time period 510. For example, computing system 102 may receive sensor data during time period 510 and receive a roll velocity signal earlier than receiving the suspension deflection velocity signal. For example, computing system 102 may determine the time difference between the roll velocity signal and the suspension deflection velocity signal (e.g., 20 milliseconds). Computing system 102 may determine that vehicle 101 experienced a collision during time period 510 in response to determining that the time difference satisfies a threshold time difference.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

The following numbered examples may illustrate one or more aspects of the disclosure:

Example 1, A method comprising: determining whether an object collided with a vehicle based on a comparison of data received from at least one motion sensor configured to measure at least an acceleration of the vehicle and data received from a plurality of level sensors, wherein each level sensor is configured to measure a relative position between a body of the vehicle and a respective wheel of a plurality of wheels of the vehicle; and performing one or more actions in response to determining the object collided with the vehicle.

Example 2. The method of example 1, wherein determining whether the object collided with the vehicle comprises: determining a first value of a motion parameter based on the data received from the at least one motion sensor, the at least one motion sensor including an accelerometer; determining a second value of the motion parameter based on the data received from the plurality of level sensors; and determining whether the object collided with the vehicle based on the first value and the second value.

Example 3. The method of example 2, further comprising determining that the object collided with the vehicle in response to determining that a difference between the first value and the second value satisfies a threshold.

Example 4. The method of example 2, wherein determining whether the object collided with the vehicle comprises applying a machine-trained model to the first value of the motion parameter and the second value of the motion parameter.

Example 5. The method of any one of examples 2-4, wherein the motion parameter includes one or more of: a roll rate of the vehicle, a pitch angle or pitch rate of the vehicle, a heave position of the vehicle, or an acceleration rate of the vehicle.

Example 6. The method of any one of examples 1-5, wherein determining whether the object collided with the vehicle is further based on a time at which the data was generated by the at least one motion sensor and a time at which the data was generated by the plurality of level sensors.

Example 7. The method of any one of examples 1-6, wherein performing the one or more actions comprises outputting a command to store image data generated by an imaging component of the vehicle.

Example 8. The method of any one of examples 1-7, wherein performing the one or more actions comprises outputting a command to control adjust a speed of the vehicle or adjust a steering component of the vehicle.

Example 9. The method of any one of examples 1-8, wherein the at least one motion sensor includes an inertial measurement unit or a plurality of accelerometers each positioned proximate a respective wheel of the plurality of wheels.

Example 10. A computing system comprising: at least one processor; a memory comprising instructions that, when executed, cause the at least one processor to: determine whether an object collided with a vehicle based on a comparison of data received from at least one motion sensor configured to measure at least an acceleration of the vehicle and data received from a plurality of level sensors, wherein each level sensor is configured to measure a relative position between a body of the vehicle and a respective wheel of a plurality of wheels of the vehicle; and perform one or more actions in response to determining the object collided with the vehicle.

Example 11. The computing system of example 10, further comprising means for performing the method of any one of examples 2-9.

Example 12. A computing system comprising means for performing the method of any one of examples 1-9.

Example 13. A computer-readable storage medium comprising instructions that, when executed by at least one processor of a computing system of a vehicle, cause the at least one processor to perform the method of any one of examples 1-9.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system comprising:
   at least one processor; and
   a memory comprising instructions that, when executed, cause the at least one processor to:
   determine whether an object collided with a vehicle based on
   an application of a machine-trained model to a first measurement of a motion parameter and a second measurement of the motion parameter, wherein the motion parameter includes one or more of: a roll rate of the vehicle, a pitch angle or pitch rate of the vehicle, a heave position of the vehicle, or an acceleration rate of the vehicle, the application of the machine-trained model comprising a comparison of the first measurement of the motion parameter with the second measurement of the motion parameter and a determination whether the comparison indicates a collision or a non-collision,
   wherein the first measurement of the motion parameter is determined based on data received from at least one motion sensor configured to measure at least an acceleration of the vehicle,
   wherein the second measurement of the motion parameter is determined based on data received from based on data received from a plurality of level sensors, wherein each level sensor is configured to measure a relative position between a body of the vehicle and a respective wheel of a plurality of wheels of the vehicle; and
   perform one or more actions in response to determining that the object collided with the vehicle.

2. The computing system of claim 1, wherein the at least one motion sensor includes an accelerometer.

3. The computing system of claim 1, wherein execution of the instructions causes the at least one processor to determine that the object collided with the vehicle in response to determining that a difference between the first value and the second value satisfies a threshold.

4. The computing system of claim 3, wherein execution of the instructions causes the at least one processor to determine whether the object collided with the vehicle by at least causing the at least one processor to determine the threshold based on a speed of the vehicle.

5. The computing system of claim 1, wherein the machine-trained model is trained using historical sensor data and at least one associated classification comprising a collision or a non-collision.

6. The computing system of claim 1, wherein execution of the instructions causes the at least one processor to determine whether the object collided with the vehicle based on a time at which the data was generated by the at least one motion sensor and a time at which the data was generated by the plurality of level sensors.

7. The computing system of claim 1, wherein execution of the instructions causes the at least one processor to perform the one or more actions comprises by at least causing the at least one processor to output a command to store image data generated by an imaging component of the vehicle.

8. The computing system of claim 1, wherein execution of the instructions causes the at least one processor to perform the one or more actions by causing the at least one processor to output a command to control adjust a speed of the vehicle or adjust a steering component of the vehicle.

9. The computing system of claim 1, wherein the at least one motion sensor includes an inertial measurement unit or a plurality of accelerometers each positioned proximate a respective wheel of the plurality of wheels.

10. A device configured to detect low-impact collisions, the device comprising:
    means for determining whether an object collided with a vehicle based on a determination of a first value of a motion parameter based on data received from at least one motion sensor configured to measure at least an acceleration of the vehicle, a determination of a second value of the motion parameter based on data received from a plurality of level sensors, wherein each level sensor is configured to measure a relative position between a body of the vehicle and a respective wheel of a plurality of wheels of the vehicle, and an application of a machine-trained model to the first value of the motion parameter and the second value of the motion parameter, wherein the application of the machine-trained model comprises a comparison of the first value of the motion parameter with the second value of the motion parameter and a determination whether the comparison indicates a collision or a non-collision, wherein the motion parameter includes one or more of: a roll rate of the vehicle, a pitch angle or pitch rate of the vehicle, a heave position of the vehicle, or an acceleration rate of the vehicle; and
    means for performing one or more actions in response to determining the object collided with the vehicle.

11. A method comprising:
    determining whether an object collided with a vehicle based on an application of a machine-trained model to a first measurement of a motion parameter and a second measurement of the motion parameter,
        wherein the application of the machine-trained model comprises a comparison of the first measurement of the motion parameter with the second measurement of the motion parameter and a determination whether the comparison indicates a collision or a non-collision,
        wherein the motion parameter includes one or more of: a roll rate of the vehicle, a pitch angle or pitch rate of the vehicle, a heave position of the vehicle, or an acceleration rate of the vehicle,
        wherein the first measurement of the motion parameter is determined based on data received from at least one motion sensor configured to measure at least an acceleration of the vehicle,
        wherein the second measurement of the motion parameter is determined based on data received from a plurality of level sensors, wherein each level sensor is configured to measure a relative position between a body of the vehicle and a respective wheel of a plurality of wheels of the vehicle; and
    performing one or more actions in response to determining that the object collided with the vehicle.

12. The method of claim 11, the at least one motion sensor including an accelerometer.

13. The method of claim 11, further comprising determining that the object collided with the vehicle in response to determining that a difference between the first measurement and the second measurement satisfies a threshold.

14. The method of claim 13, wherein determining whether the object collided with the vehicle comprises determining the threshold based on a speed of the vehicle.

15. The method of claim 12, wherein the machine-trained model is trained using historical sensor data and at least one associated classification comprising a collision or a non-collision.

16. The method of claim 11, wherein determining whether the object collided with the vehicle is further based on a time at which the data was generated by the at least one motion sensor and a time at which the data was generated by the plurality of level sensors.

17. The method of claim 11, wherein performing the one or more actions comprises outputting a command to store image data generated by an imaging component of the vehicle.

18. The method of claim 11, wherein performing the one or more actions comprises outputting a command to control adjust a speed of the vehicle or adjust a steering component of the vehicle.

19. The method of claim 11, wherein the at least one motion sensor includes an inertial measurement unit or a plurality of accelerometers each positioned proximate a respective wheel of the plurality of wheels.

20. A non-transitory computer-readable storage medium comprising instructions that, when executed by at least one processor of a computing system of a vehicle, cause the at least one processor to:
    determine whether an object collided with a vehicle based on an application of a machine-trained model to a first measurement of a motion parameter and a second measurement of the motion parameter, the application comprising a comparison of the first measurement of the motion parameter with the second measurement of the motion parameter and a determination whether the comparison indicates a collision or a non-collision, wherein the motion parameter includes one or more of: a roll rate of the vehicle, a pitch angle or pitch rate of the vehicle, a heave position of the vehicle, or an acceleration rate of the vehicle, wherein the first measurement of the motion parameter is determined based on data received from at least one motion sensor configured to measure at least an acceleration of the vehicle, wherein the second measurement of the motion parameter is determined based on data received from a plurality of level sensors, wherein each level sensor is configured to measure a relative position between a body of the vehicle and a respective wheel of a plurality of wheels of the vehicle; and perform one or more actions in response to determining the object collided with the vehicle.

* * * * *